Nov. 23, 1937.    R. H. BERG    2,099,998
LOADING AND UNLOADING DEVICE FOR TRUCKS OR OTHER VEHICLES
Filed Feb. 17, 1937    3 Sheets-Sheet 3
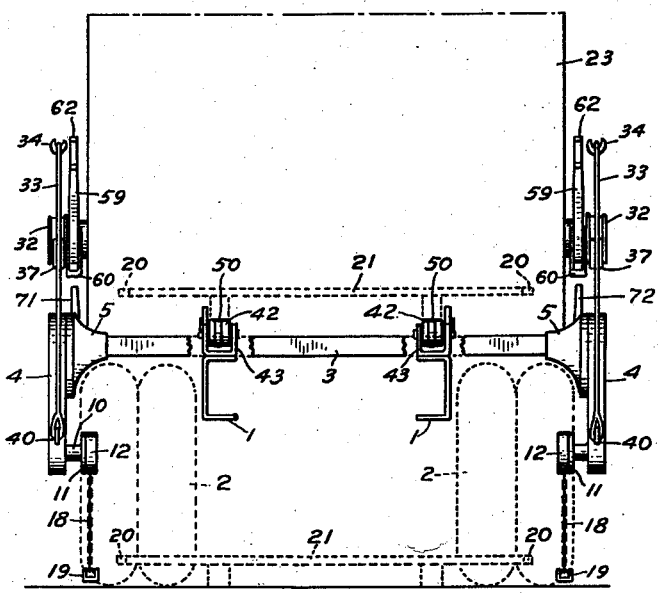
Fig. 5.
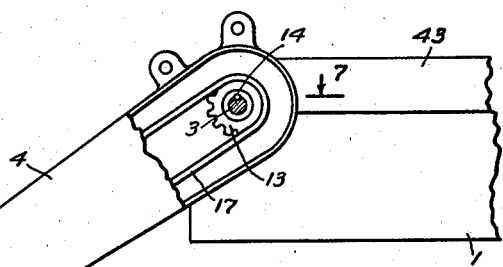
Fig. 6.
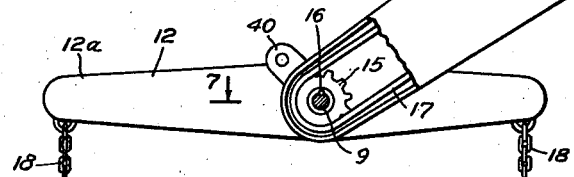
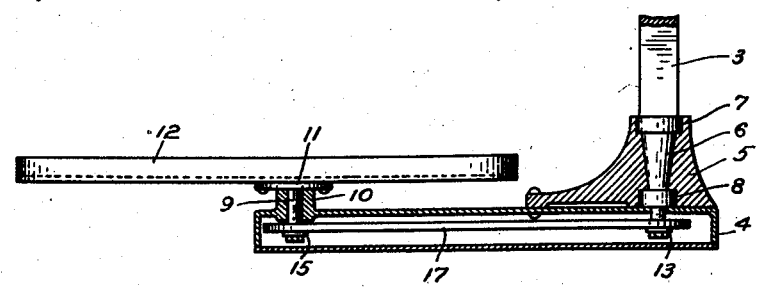
Fig. 7.
INVENTOR.
ROBERT H. BERG
BY
ATTORNEY.

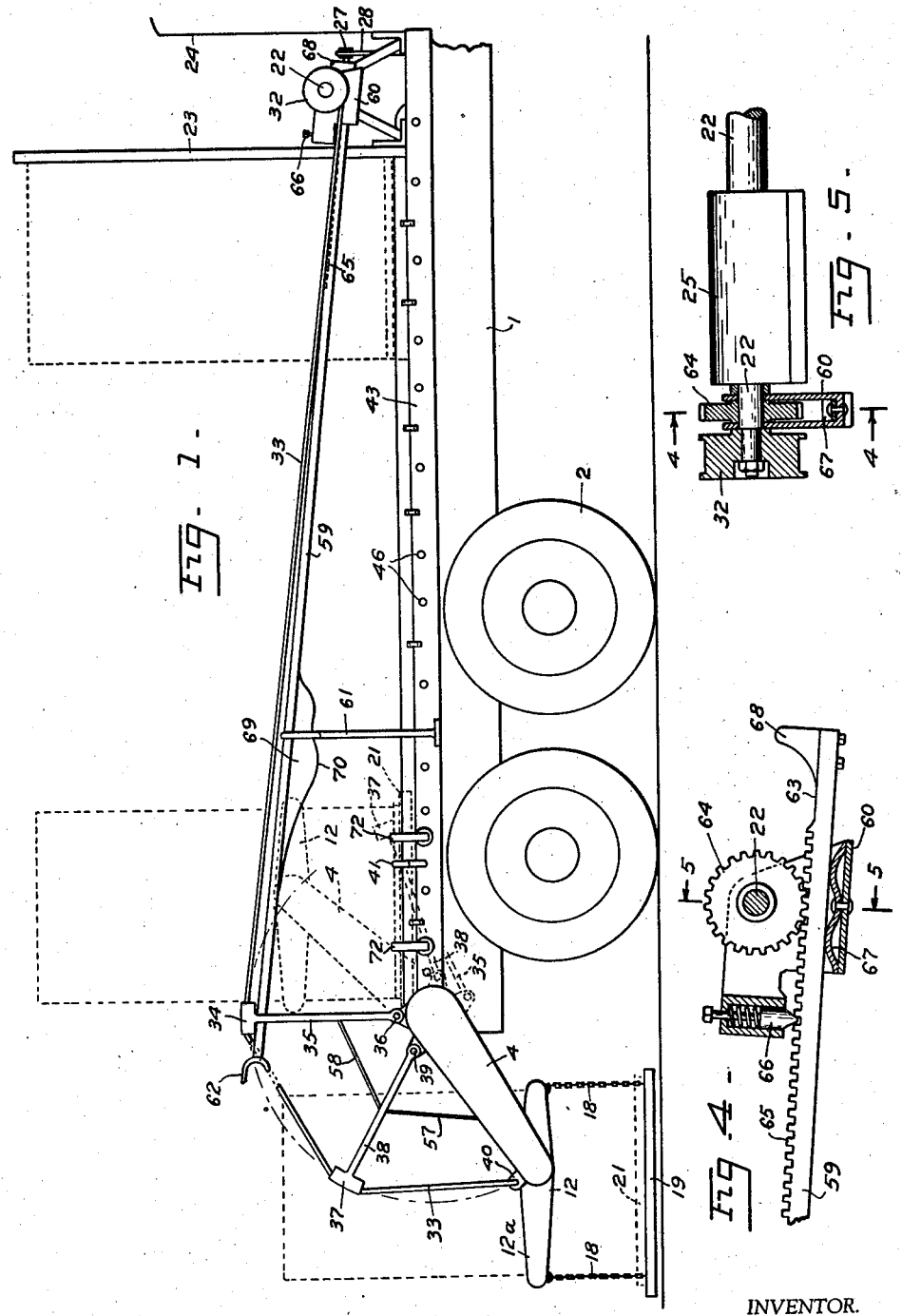

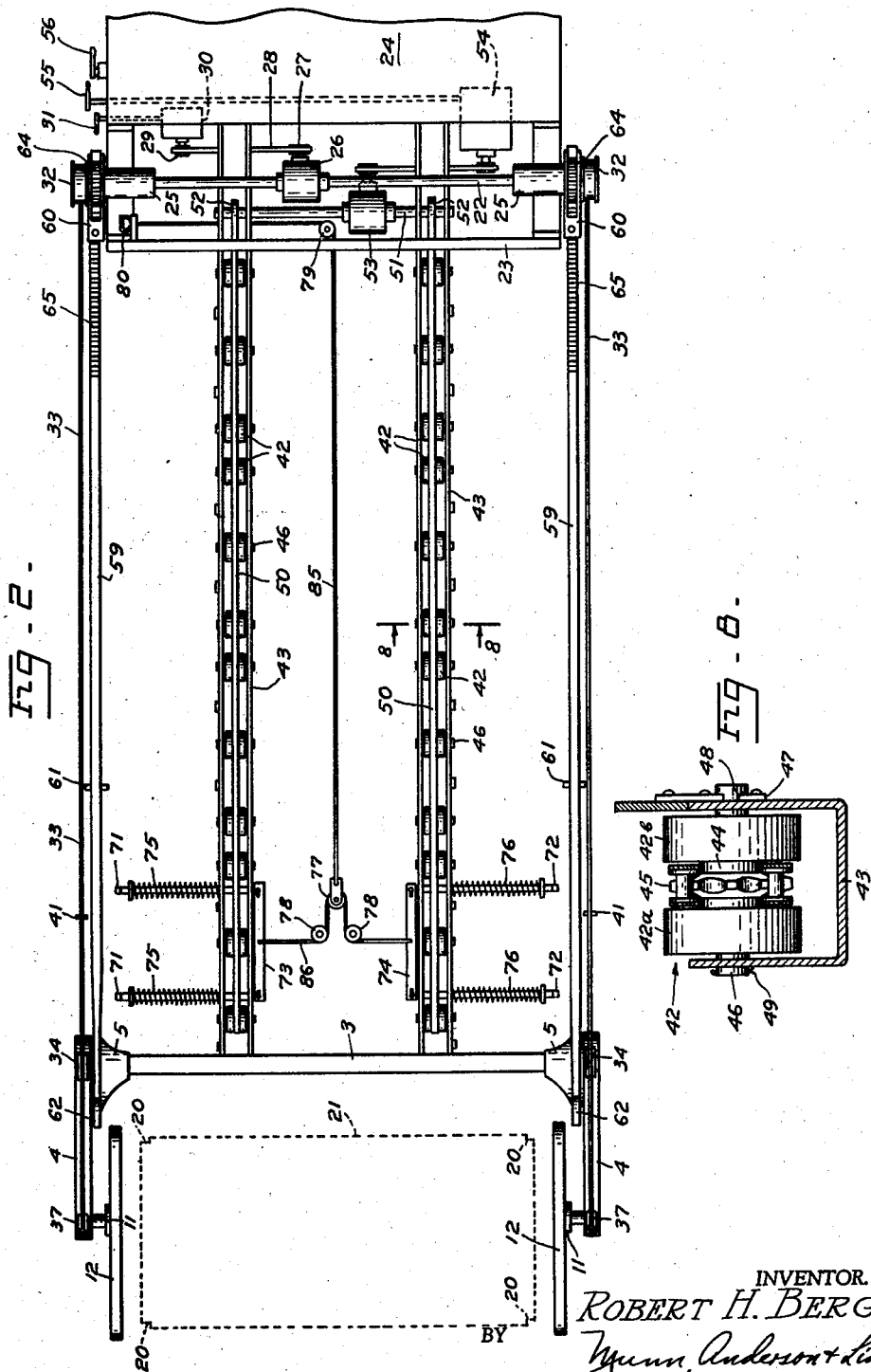

Patented Nov. 23, 1937

2,099,998

UNITED STATES PATENT OFFICE 2,099,998

LOADING AND UNLOADING DEVICE FOR TRUCKS OR OTHER VEHICLES

Robert H. Berg, San Francisco, Calif.

Application February 17, 1937, Serial No. 126,187

13 Claims. (Cl. 214—77)

My invention relates to improvements in a loading and unloading device for trucks or other vehicles, and it consists of the combinations, constructions and arrangements hereinafter described and claimed.

An object of my invention is to provide a loading and unloading device for trucks or other vehicles, in which two arms are swingably mounted at the rear corners of a truck, these arms pivotally carrying yokes to which chains are attached and these chains in turn carrying pallet board supporting members. The yokes are pivoted off center so that the rearmost ends of the yokes will have a tendency to swing downwardly due to gravity. I provide novel means for swinging the arms for causing the arms to lift a load from the ground to the truck. I further provide novel means for preventing the yoke from moving out of a horizontal plane during the entire loading operation. This is one of the principal features of the invention.

A source of power is used for swinging the arms to lift a loaded pallet board or deck onto the truck, and this same source of power operating through a different mechanism is used for swinging the arms in a reverse direction when unloading the truck. I dispose two parallel channels on the truck frame and these carry rollers for supporting the loaded decks. A chain is passed around the group of rollers in each channel and I provide a source of power for moving the chains and rotating the rollers in order to advance the loaded deck along the truck after it has been freed from the lifting arms.

The yokes carried by the arms are pivotally spaced a greater distance apart than the length of the deck. In unloading the decks from the truck, the channels carried by the yokes will be disposed beyond the ends of the deck. I provide novel means for moving the deck lifting channels beneath the deck, prior to the swinging of the arms for lifting the deck from the truck and conveying the deck to the ground.

All of the control mechanisms are placed near each other so that a single operator can control the unloading of the decks from the truck. The device is simple in construction and is durable and efficient for the purpose intended. The device occupies very little space on the truck, and does not interfere with the load supporting area.

Other objects and advantages will appear in the following specification, and the novel features of the device will be particularly pointed out in the appended claims.

My invention is illustrated in the accompanying drawings forming a part of this application, in which Figure 1 is a side elevation of a truck showing my device operatively applied thereto;

Figure 2 is a plan view of the truck and device;

Figure 3 is a rear elevation of the truck and device;

Figure 4 is a section along the line 4—4 of Figure 5;

Figure 5 is a section along the line 5—5 of Figure 4;

Figure 6 is an enlarged side elevation of one of the deck lifting arms, portions of the cover plate being broken away for clarity;

Figure 7 is a section substantially along the line 7—7 of Figure 6 and showing the yoke in elevation; and Figure 8 is a section along the line 8—8 of Figure 2.

In carrying out my invention I make use of a truck chassis indicated generally at 1, and I show the chassis supported by wheels 2. Figure 3 shows the chassis formed from two channel irons, and Figure 2 illustrates how the chassis carries an axle 3 square in cross section, and secured to the chassis in any manner desired so that the axle cannot rotate. At each end of the axle I mount an arm 4 and since both arms are of identical construction, a description of one will suffice. A detail of the arm is shown in Figures 6 and 7.

The arm 4 is in the shape of a casing that is secured to a housing 5 that is rotatably mounted upon an end 6 of the axle 3. Suitable bearings 7 and 8 are mounted in the housing 5 and rotate on the axle end 6. At the free end of the casing 4 I rotatably mount a stub shaft 9. This shaft is mounted in a bearing 10 that is carried by the casing 4. The shaft 9 has a flanged head 11 and a yoke 12 is secured to the head. Figure 6 shows a sprocket 13, keyed to the shaft 3 at 14 and a second sprocket 15 is keyed to the shaft 9 at 16. A sprocket chain 17 is passed around both sprockets.

It will be seen in this connection, that a swinging of the arm 4 by a means hereinafter described, will cause the sprocket 15 to rotate the shaft 9 because the sprocket 13 is held against rotation since it is keyed to the nonrotatable shaft 3. The sprocket 13 will rotate as the arm 4 swings and this will hold the yoke 12 in a horizontal position during the entire swinging of the arm. As already stated this is one of the principal features of the invention.

Figure 6 clearly shows the end 12a of the yoke 12 as of greater length than the other end of the yoke. The yoke will therefore have a tendency to swing in a counterclockwise direction about the shaft 9. This is for the purpose of causing the upper portion of the chain 17 connecting the two sprockets together, to be held taut during the entire swinging of the arms. In this way the yoke 12 will be held against rocking out of a horizontal plane during the swinging of the arm.

The yoke 12 carries load supporting chains 18 and Figures 1 and 3 show each pair of chains 18 as supporting deck lifting channels 19. The chains in each pair are supported far enough apart to permit them to be received in notches 20 in a deck 21 (see the dotted line showing of the deck in Figure 2).

The means for swinging the arms 4 from the full line position into the dotted line position in Figure 1 comprises a shaft 22 (see Figure 2) that extends transversely across the truck, the shaft being disposed between a head board 23 and a driver's compartment 24 (see Figure 1). The shaft 22 is mounted in bearings 25 and is rotated by a worm and a worm gear (not shown) both being mounted in a housing 26. The worm is rotated by a sprocket 27 (see Figure 2) and the sprocket is connected by a chain 28 to a sprocket 29 which in turn is operatively connected to a power take-off indicated diagrammatically at 30. A lever 31 is connected to the power take-off 30 and may be manually operated for connecting the sprocket 29 with a truck engine (not shown) so that the sprocket 29 will rotate in either direction. The lever 31 may also be moved into neutral position and the sprocket 29 will be disconnected from the engine. The worm and worm gear in the housing 26 act as an automatic lock for the shaft 22 for holding the shaft against rotation unless the sprocket 27 is rotated.

The mechanisms connecting the shaft 22 with each arm 4 are identical and therefore a description of one will suffice. A drum 32 is mounted at an end of the shaft 22 and a cable 33 has one end secured to the drum. Figure 1 shows the cable 33 passed over a grooved end 34 of a link 35 that is pivoted at 36 to the casing 4. The cable 33 is also passed over a grooved end 37 of a second link 38 that is pivoted at 39 to the casing 4. The end of the cable is attached to an eyelet 40 that in turn is secured to the free end of the arm 4.

It will be seen from this construction that a rotation of the shaft 22 in a counterclockwise direction when looking at Figure 1, will cause both drums 32 to wind their cables 33 thereon and to swing the lifting arms 4 from the full line position shown in Figure 1 into the dotted line position. During this movement the links 35 and 38 of each arm 4 will be swung into the dotted line position shown and will be supported by the Y-shaped members 41. When the arms 4 reach the dotted line position, the yokes 12 will place the pallet board or deck 21 on the truck. The chains 18 will be freed from the loaded deck because the channel members 19 will drop below the undersurface of the deck and then will swing by gravity into a position directly underneath each yoke 12. Figure 2 shows both yokes 12 spaced a greater distance apart than the length of the deck 21.

The loaded deck will now be supported on rollers 42 that are mounted in channels 43 (see Figure 2) that extend throughout the length of the truck. Figure 8 shows an enlarged sectional view of one of the channels 43 and it will be noted from this view that each roller 42 consists of two enlarged portions 42a and 42b separated by a reduced portion 44. A sprocket 45 is formed on the portion 44. The wheel 42 rotates on a shaft 46 that is carried by the channel 43. The shaft is held against rotation by a keeper 47 that enters a slot 48 in the shaft. A cotter pin 49 is passed through an opening in the other end of the shaft.

Figure 2 shows the rollers 42 disposed in groups of three and these three rollers are so arranged as to support a loaded deck. An endless chain 50 is passed around the sprocket of the rearmost roller and also passes over the sprockets of the remaining rollers. A shaft 51 carries two sprockets 52 for moving the chains 50 to rotate the rollers. The shaft is provided with a worm and a worm gear mechanism 53 similar to the mechanism 26, and the mechanism 53 is actuated by a power take-off 54 similar to the power take-off 30.

A lever 55 similar to the lever 31 is used for connecting the power take-off 54 with the truck engine (not shown) so that the chains 50 may be moved in either direction or may remain disconnected from the power take-off. When the chains 50 are actuated, the rollers 42 are rotated in the desired direction and will move the loaded decks as desired.

When connecting the shafts 22 or 51 to their respective power take-offs for causing the shafts to rotate in either direction, it is necessary to disconnect the engine clutch (not shown). This can be done by a standard mechanism operated by means of a vacuum. I show a lever 56 for controlling the vacuum to the clutch disengaging member. It will be noted that all three levers 31, 55 and 56 are placed near each other where an operator can actuate the levers from a single position.

It should be noted at this point that when the arms 4 are swung from the dotted line position into the full line position shown in Figure 1, the links 35 and 38 associated with each arm will be lifted from their supports 41 by flexible connections 57 and 58. The connection 57 extends from the arm 4 to the link 38 while the connection 58 connects the link 35 to the link 38. The length of the connections 57 and 58 is such as to position the links in the manner indicated in Figure 1 when the arms are ready to lift another loaded deck onto the truck.

I provide novel means for swinging the arms 4 from the dotted line position shown in Figure 1 back into the full line position. This means comprises a pair of rack bars 59, each bar being slidably disposed in a casing 60 (see Figure 4). The other end of each rack bar is supported in a forked upright 61. The casing 60 is rockably mounted on the shaft 22 and the upright 61 is carried by the truck chassis 1. Figure 1 shows the rear end of the rack bar 59 as being provided with a fork 62. The upright 61 holds the bar 59 in such a position that the fork 62 will receive the bearing 10 of the arm 4 as the arm swings from the full line position into the dotted line position.

Since both racks 59 and associated mechanisms are identical in construction, a description of one will suffice for both. When the rack bar 59 is in a fully extended position as shown in Figure 1, a recess 63 formed at the front end of the bar (see Figure 4) will receive a gear 64. This gear is secured to the shaft 22 so as to turn therewith. The gear 64 will merely rotate in the recess 63 during the movement of the arm 4 from the full line position shown in Figure 1 until the bearing 10 of the arm enters the fork 62. At this moment, further movement of the arm 4 will also move the bar 59 and the gear 64 will ride along the rack teeth 65.

I prevent the gear 64 accidentally meshing with the teeth 65 before the bearing 10 engages with the fork 62 by providing a spring pressed pawl 66 that yieldingly engages with the teeth. When the arm 4 starts to move the rack bar 59, the pawl 66 will yieldingly engage with the teeth 65 as the pinion 64 moves along the rack. A leaf spring 67 (see Figure 4) is used for yieldingly holding the bar 59 in engagement with the pinion 64. The bar 59 has a stop 68 that prevents the bar from being entirely withdrawn from the casing 60.

In Figure 5, I show the gear 64 as being of the same diameter as the drum 32. It will therefore be seen that as the cable 33 is wrapped on the drum 32, the rack bar 59 will be moved at the same speed so that the bar will permit the arms 4 to be swung into the dotted line position. In actual practice the bar 59 will move a trifle faster than the cable 33 during the lifting of the arms 4 in order that the cable 33 will not exert a direct pull upon the bar but instead will only pull on the arms 4. After the arms 4 pass dead center, the bars 59 control their further movement in a clockwise direction.

When it is desired to return the arms to the full line position shown in Figure 1, the operator merely actuates the lever 55 (see Figure 2) for reversing the rotation of the shaft 22. This will cause the drums 32 to unwind the cables 33 and will further cause the pinions 64 to move the rack bars 59 rearwardly with respect to the truck. The bars 59 through the forks 62 will swing the arms 4 until the arms pass dead-center position at which time the arms will continue in their counterclockwise movement due to gravity.

It will be noticed during the rear movement of the bars 59 that they will be swung slightly about the axis of the shaft 22 as a pivot. This is due to the fact that the forks 62 when engaging with the arms will describe arcs about the axis of the shaft 3. It is only necessary to support the free ends of the bars 59 when the forks 62 are disconnected from the bearings 10 on the arms 4. I provide a projection 69 (see Figure 1) on each bar 59 and the undersurface of the projection is curved in the manner shown at 70. The projection 69 rests in the upright 61 and supports the bar when the arm 4 is disconnected therefrom. As soon as the arms 4 engage with the forks 62 and move the bars 59 forwardly with respect to the truck, the bars will swing slightly as they are moved forwardly and the projections 69 will move through the uprights 61. When the bars 59 are in their forwardmost position, they will not be supported by the upright 61.

During the unloading of the decks 21 from the truck, it is possible to move the deck lifting channels 19 directly beneath the decks. To accomplish this I provide two pairs of L-shaped fingers 71—71 and 72—72. The fingers 71 are slidably supported in one channel 43 while the fingers 72 are slidably supported in the other channel. An equalizing bar 73 is connected to the fingers 71 and a second equalizing bar 74 is connected to the fingers 72. Coil springs 75 on the fingers 71 and similar springs 76 on the fingers 72 urge these fingers into their outermost positions. When the fingers are in their outermost positions, they will straddle a deck 21 (see Figure 3). The arms 4 when in the dotted line position shown in Figure 1 will permit the chains 18 depending from the yokes 12 to pass the members 19 down between the ends of the deck 21 and the fingers 71 and 72.

The fingers may now be moved toward each other by means of a cable 85 connected to a cable 86 by pulleys 77 and 78, the free ends of the cable 86 being connected to the equalizing bars 73 and 74. The cable 85 is passed around a pulley 79 and is provided with a handle 80. The operator on pulling the handle 80 will move the pulley 77 and cause the cable 86 to move the equalizing bars 73 and 74 toward each other. This movement will in turn move the fingers 71 and 72 into contact with the ends of the deck 21 and they will move the members 19 beneath the deck. The fingers 71 and 72 are held in contact with the deck during the initial movement of the arms 4 from the dotted line position into the full line position shown in Figure 1. It will therefore be seen that the fingers 71 and 72 act as guides for the members 19 and will cause the members to engage with the undersurface of the deck 21 during their upward movement. The friction of the members 19 against the deck created by lifting the loaded deck, will prevent the members from accidently disengaging from the deck until it has been moved onto the ground and the chains 18 and members 19 have been freed from their load.

From the foregoing description of the various parts of the device, the operation thereof may be readily understood. The term truck, wherever mentioned, in the specification and claims is to be construed broadly to include all types of vehicles.

During the description of the device the operation has also been partially described. In the actual loading of the decks onto the truck, the members 19 are manually held beneath the deck until the arms 4 start to lift the deck. The arms will then swing the loaded deck onto the rear of the truck as shown in Figure 1. The lever 31 may now be moved to disconnect the shaft 22 from the operating mechanism and the lever 55 may be actuated for causing the chains 50 to rotate the rollers 42 and move the loaded deck to the front part of the truck as shown in Figure 1. The arms 4 are now returned for another load and the operation is repeated until the truck is entirely loaded.

When unloading the truck, the arms 4 will be in the dotted line position as shown in Figure 1. The handle 80 is moved for bringing the members 19 beneath the rearmost deck 21 on the truck and during the initial movement of the arms 4 toward the full line position shown in Figure 1, they will move the members 19 against the deck. Further movement of the arms 4 will transfer the deck to the ground. The channels 19 fall free of the deck by swinging outwardly due to gravity. After the loaded deck has been placed on the ground or other supporting surface, the next load may either be placed on top of the first load or the truck may be moved forwardly to provide sufficient space for the next load. The lever 55 is now actuated for moving the chains 50 for rotating the rollers 42 and these will move the next loaded deck toward the rear of the truck. The arms 4 are again swung into the dotted line position shown in Figure 1 and the fingers 71 and 72 are moved for disposing the members 19 beneath the loaded deck. The arms 4 will now lift the next loaded deck from the vehicle and will place it on the ground. This operation is repeated until the entire truck is unloaded.

While I have shown only the preferred form of my invention, it should be understood that various changes or modifications may be made within the scope of the appended claims without departing from the spirit of the invention.

I claim:

1. A loading and unloading device for vehicles comprising a pair of arms pivotally secured to the rear corners of a truck, sprockets placed at the pivotal axis of the arms and being held against rotation, stub shafts rotatably carried by the free ends of the arms, sprockets keyed to the shafts, chains connecting the sprockets in each arm together, and a load lifting yoke rigidly connected to each stub shaft, said yokes being held in the same angular position with respect to the vehicles by the chains and sprockets during the entire swinging of the arms.

2. A loading and unloading device for vehicles comprising a pair of arms pivotally secured to the rear corners of a vehicle, sprockets placed at the pivotal axis of the arms and being held against rotation, stub shafts rotatably carried by the free ends of the arms, sprockets keyed to the shafts, chains connecting the sprockets in each arm together, and a load lifting yoke rigidly connected to each stub shaft, said yokes being held in the same angular position with respect to the truck by the chains and sprockets during the entire swinging of the arms, said yokes being connected to the shafts off center with the longer arms of the yokes extending rearwardly from the truck, whereby the longer arm portions of the yokes will have a tendency to swing downwardly due to gravity and this will keep one side of the chains taut and prevent the rocking of the yokes into various angular positions with respect to the vehicle during the movement of the arms.

3. In combination, a pair of arms pivotal about a common axis, a non-rotatable sprocket for each arm and placed at the axis, stub shafts rotatable carried by the free ends of said arms, sprockets keyed to the shafts, chains connecting the sprockets together, yokes rigidly connected to the shafts and being held in horizontal positions during the swinging of the arms, load lifting chains depending from the ends of the yokes, and deck lifting members secured to the chains.

4. The combination with a vehicle, of arms pivoted to the rear corners of the vehicle, load lifting yokes pivoted to the free ends of the arms, means for maintaining the yokes in a horizontal position during the swinging of the arms, and arm lifting means comprising a drum for each arm, a cable for each arm, each cable being secured to one of the drums and to the free end of the arm associated with the drum, links pivoted to each arm for supporting intermediate portions of the cables away from the axis of the arms, and flexible connections for moving the links into operative positions as the arms swing outwardly away from the rear end of the vehicle.

5. In combination, a pair of load lifting arms swingable about a common axis, a shaft, a drum disposed at each end of the shaft, a pair of cables, one being secured to each drum and to an associate arm for swinging the arms to lift a load when the cables are wound onto the drums, and separate means for controlling the movement of the arms when they are swung beyond dead center.

6. In combination, a pair of load lifting arms swingable about a common axis, a shaft, a drum disposed at each end of the shaft, a pair of cables, one being secured to each drum and to an associate arm for swinging the arms to lift a load when the cables are wound onto the drums, and separate means for controlling the movement of the arms when they are swung beyond dead center, said means including guides rotatable on said shaft, rack bars slidable in the guides, pinions keyed to the shaft and designed to mesh with the racks when the arms engage with the bars for controlling the movement of the arms.

7. In combination, a pair of load lifting arms swingable about a common axis and movable beyond a dead center line position when lifting a load onto a supporting surface or removing a load therefrom, cables for swinging the arms beyond a dead center position when lifting a load, means for winding the cables for swinging the arms, rods engaging with the arms just before the arms reach dead center, means controlling the movement of the rods for permitting the arms to move slowly after passing dead center for gently depositing the load on the supporting surface, said rod moving means being adapted to reverse the movement of the rods for reversing the swinging of the arms for causing them to move beyond dead center, said cable moving means controlling the paying out of the cables for permitting the arms to slowly swing due to gravity.

8. In combination, a shaft, a drum mounted thereon, a swingable arm, a cable connecting the arm with the drum, means for rotating a shaft for winding the cable on the drum for swinging the arm beyond dead center, a guide rockably mounted on the shaft, a rod slidable in the guide and designed to engage with the arm just before the arm reaches dead center, a pinion secured to the shaft, said rod having a rack portion movable into meshing relation with the pinion when the rod is moved by the arm, whereby the rotation of the shaft will control the swinging of the arm beyond dead center.

9. In combination, a shaft, a drum mounted thereon, a swingable arm, a cable connecting the arm with the drum, means for rotating a shaft for winding the cable on the drum for swinging the arm beyond dead center, a guide rockably mounted on the shaft, a rod slidable in the guide and designed to engage with the arm just before the arm reaches dead center, a pinion secured to the shaft, said rod having a rack portion movable into meshing relation with the pinion when the rod is moved by the arm, whereby the rotation of the shaft will control the swinging of the arm beyond dead center, said shaft rotating means being reversible for causing the pinion to move the rod and arm in a reverse direction until the arm passes dead center, said shaft thereafter controlling the rotation of the drum for slowly feeding the cable therefrom for controlling the swinging of the arm after passing dead center.

10. The combination with a vehicle body, of arms pivotally secured thereto and rotatable about a common axis, yokes pivoted to the free ends of the arms, chains depending from the ends of the yokes, deck lifting members carried by the chains and normally being disposed a greater distance apart than the length of a deck, means on the vehicle body for supporting the decks and allowing the members to swing beneath one of the decks, manually controlled means for moving the members beneath a deck when the arms are in a position to lower the members below the deck, and means for swinging the arms for causing the members to first engage with the deck and then to lift it off from the vehicle body.

11. In combination, an arm moving bar having a rack tooth portion, and a recess adjacent to the portion, a shaft, a guide rockable on the shaft, a pinion secured to the shaft, a spring for yieldingly moving the bar toward the pinion, said pinion being normally rotatable in the bar recess but meshing with the teeth for moving the bar when the bar is given an initial movement to cause the pinion to mesh with the teeth.

12. In combination, an arm moving bar having a rack tooth portion, and a recess adjacent to the portion, a shaft, a bar guide rockable on the shaft, a pinion secured to the shaft, a spring for yieldingly moving the bar toward the pinion, said pinion being normally rotatable in the bar recess but meshing with the teeth for moving the bar when the bar is given an initial movement to cause the pinion to mesh with the teeth, and a spring pressed pin yieldingly engaging with the teeth for preventing the accidental meshing of the pinion with the teeth.

13. A loading and unloading device for vehicles comprising a pair of arms pivotally mounted on a vehicle and being spaced far enough apart to straddle a load, load supporting yokes pivotally secured to the free ends of the arms, means for swinging the arms for raising or lowering the yokes and the load carried thereby, and means actuated by the swinging arms for continuously holding the yokes in a horizontal position regardless of the angular position of the arms, whereby the yokes are capable of lifting a load in which the center of gravity is disposed above the connection between the arms and yokes.

ROBERT H. BERG.